No. 640,161. Patented Dec. 26, 1899.
L. HESSE.
UTILIZING WASTE COFFEE PRODUCTS.
(Application filed Oct. 12, 1899.)

(No Model.) 4 Sheets—Sheet 1.

No. 640,161. Patented Dec. 26, 1899.
L. HESSE.
UTILIZING WASTE COFFEE PRODUCTS.
(Application filed Oct. 12, 1899.)
(No Model.) 4 Sheets—Sheet 2.

Witnesses
Inventor
Leopold Hesse
by James L. Norris
Atty

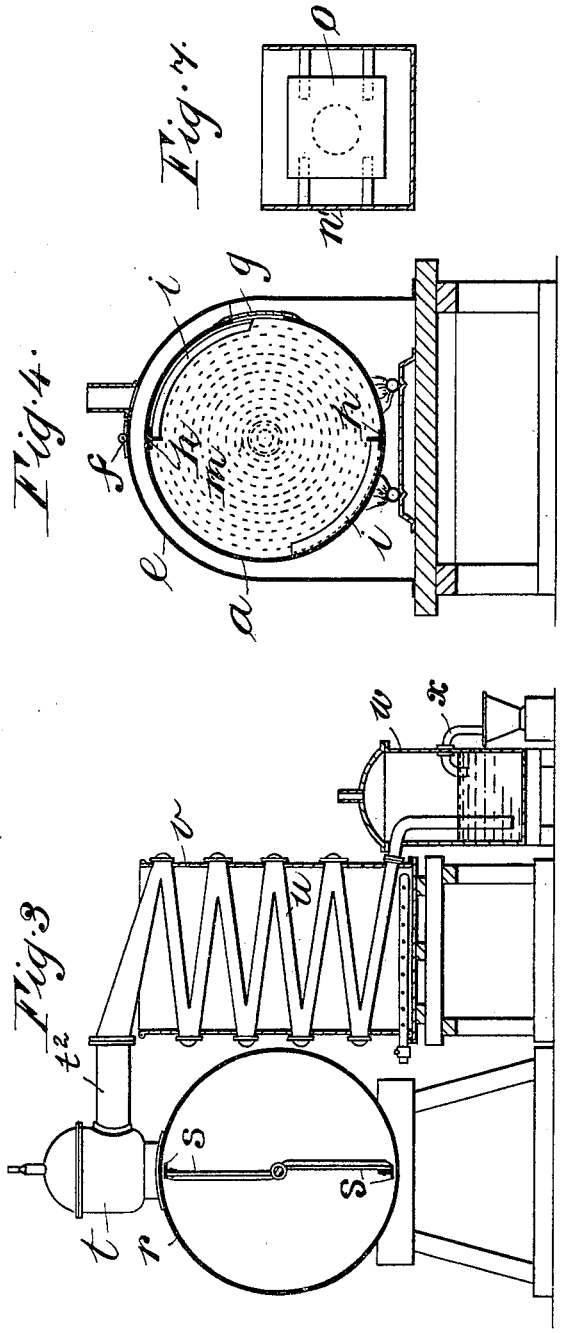

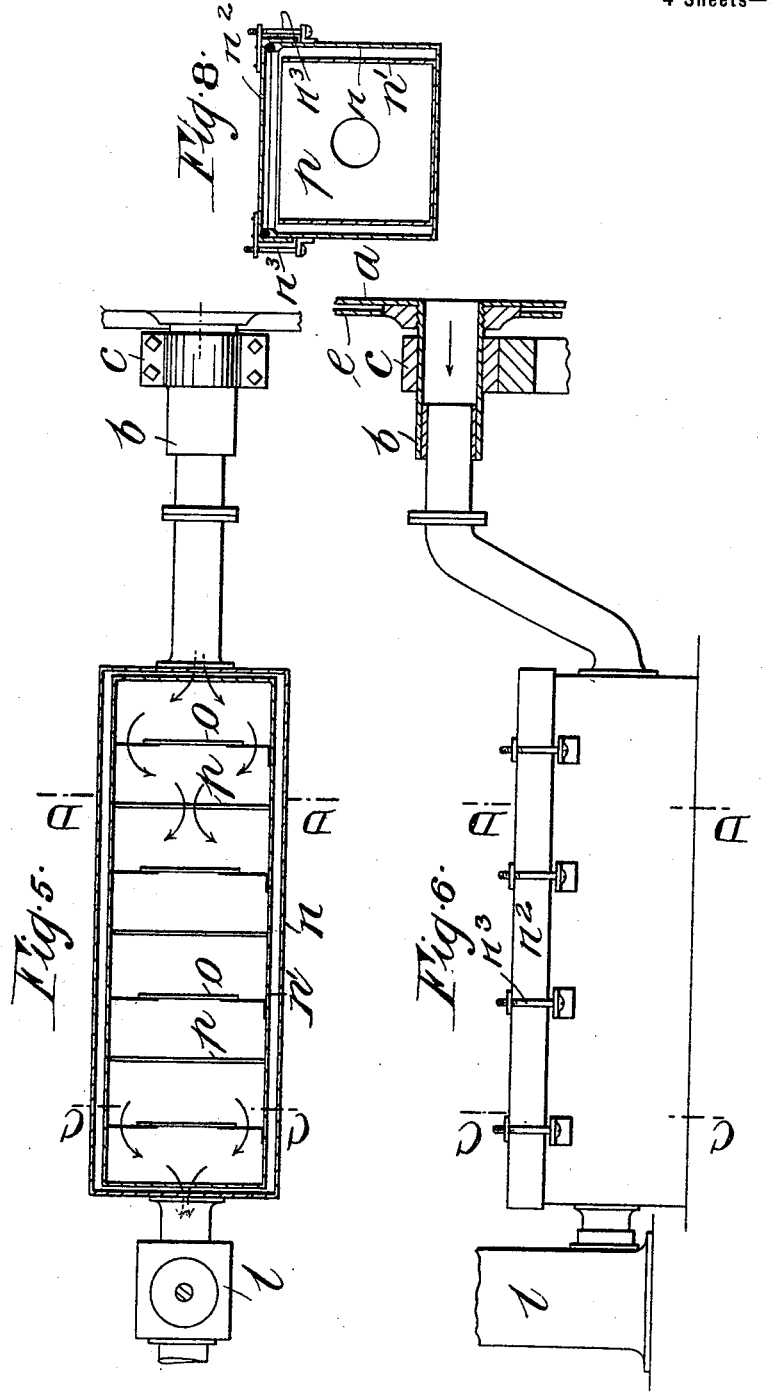

UNITED STATES PATENT OFFICE.

LEOPOLD HESSE, OF SOUTH MELBOURNE, VICTORIA.

UTILIZING WASTE COFFEE PRODUCTS.

SPECIFICATION forming part of Letters Patent No. 640,161, dated December 26, 1899.

Application filed October 12, 1899. Serial No. 733,454. (No model.)

*To all whom it may concern:*

Be it known that I, LEOPOLD HESSE, manufacturing chemist, a subject of the Queen of Great Britain, residing at No. 123 City road, South Melbourne, in the British Colony of Victoria, have invented an Improved Apparatus for Collecting and Utilizing the Waste Products of Coffee During Roasting, (for which I applied for a patent in Victoria on the 23d day of September, 1898, No. 15,568,) of which the following is a specification.

Hitherto coffee has usually been roasted in a revolving cylinder, and the vapor arising therefrom has been allowed to escape into the atmosphere and been wasted, said vapor carrying a certain proportion of caffein as well as some of the aromatic compounds and essential oils of coffee. Quantities of fine particles given off by the berries in the process of roasting have also been carried away with the escaping vapors when the coffee is being treated in the ordinary way.

Now the object of this invention is to catch or utilize said escaping vapors and fine particles which would otherwise be waste products and to produce thereby an article of commerce which will have many of the qualities of pure coffee and which will be manufactured by utilizing said fine particles and passing the coffee vapors over or through a suitable absorbent material, such as chicory or malt.

The apparatus which has been devised in order to carry this invention into practice will be readily understood from the accompanying drawings, in which—

Figure 1:
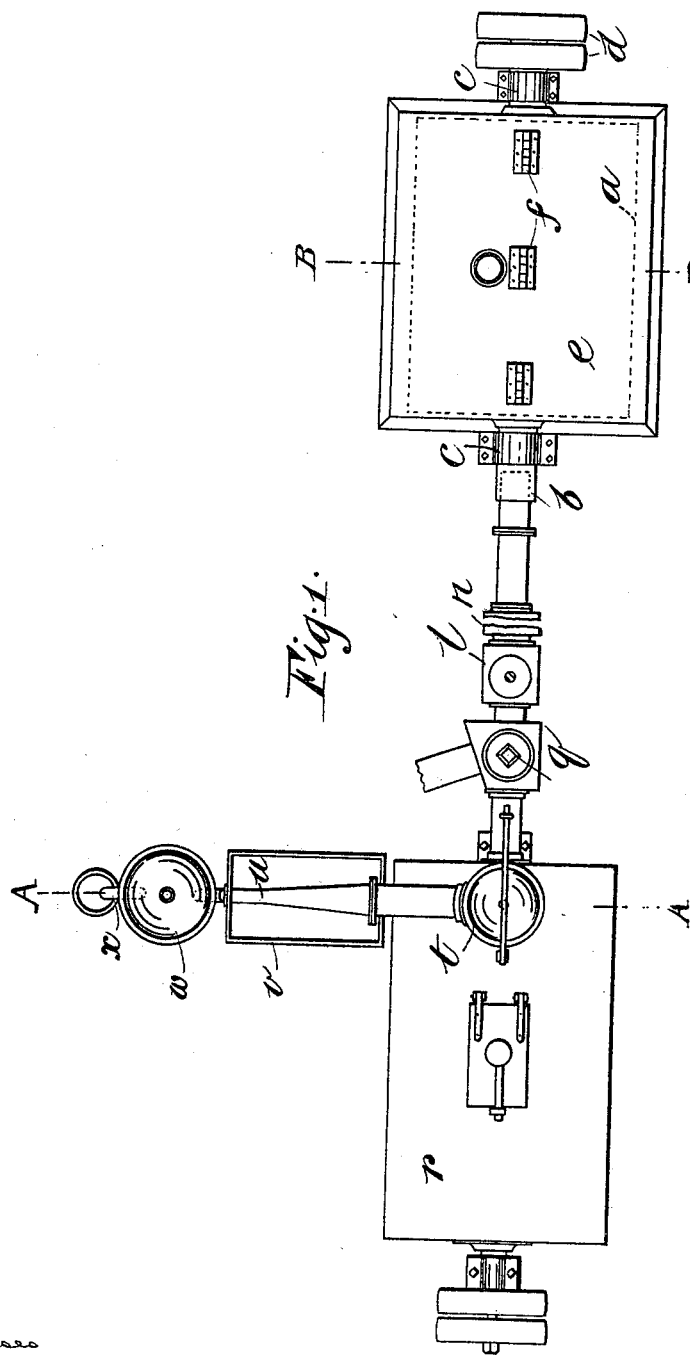
Figure 2:
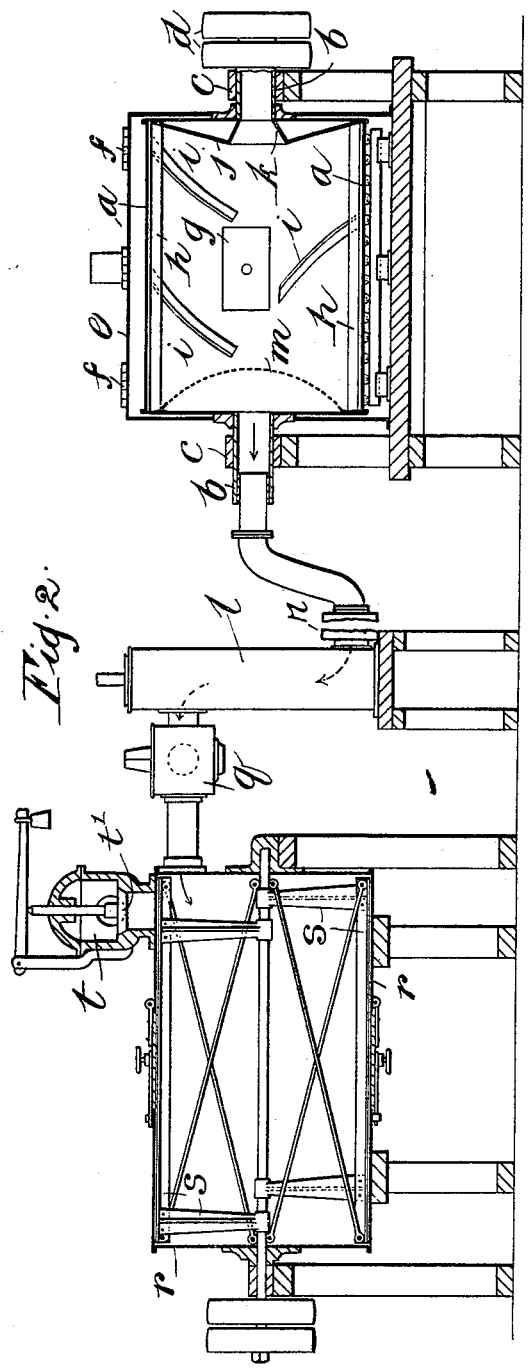

Figure 1 is a plan, and Fig. 2 a vertical central section, of the improved apparatus for roasting coffee and utilizing the volatile caffein, aromatic compounds, and essential oils therefrom. Fig. 3 is a vertical transverse section on line A A, Fig. 1. Fig. 4 is a transverse section through the roaster on line B B, Fig. 1. Fig. 5 is a horizontal section of the apparatus used for collecting the fine particles given off from the coffee-berries during roasting. Fig. 6 is a plan thereof. Figs. 7 and 8 are transverse sections on the lines C C and D D, respectively, of Figs. 5 and 6. Figs. 3 to 8 are drawn to a somewhat larger scale than Figs. 1 and 2.

The same letters of reference indicate the same parts in all the figures.

The roaster consists of a cylindrical vessel $a$, by preference made of sheet metal and mounted upon hollow trunnions or shafts $b$, supported in suitable bearings $c$ and driven by belting or other convenient gearing, for which purpose one of said hollow trunnions or shafts may be fitted with a fast and loose pulley $d$, as illustrated in Figs. 1 and 2. Said cylinder is inclosed within a cover or canopy $e$, which is preferably made in two parts hinged together at the top, as illustrated at $f$, so that one-half can be swung up out of the way to enable the door $g$, with which the cylinder $a$ is provided, to be opened or closed. This canopy may be provided with a suitable chimney to carry away the spent heat. The interior of said cylinder $a$ is provided with inwardly-projecting flanges or shelves $h$, arranged longitudinally, whereby the coffee-berries will be alternately elevated and dropped to the bottom of the cylinder, thus being continually agitated and brought into contact with the heated surface of the cylinder. Inclined projecting flanges $i$ can also be fitted inside said cylinder in order to keep the berries thoroughly mixed. To still further assist in accomplishing this object, the ends of the cylinder $a$ are formed, as illustrated at $j$, so that they are inclined inwardly toward the center. The central opening in this end corresponding with the opening in the right-hand trunnion $b$ is flared outwardly, as shown at $k$, in order to return any berries which may fall into it back into the cylinder.

By mounting the cylinder upon hollow trunnions a long scoop can readily be passed through one of them into the interior to allow a few of the berries which are being roasted to be withdrawn from time to time from the cylinder in order to ascertain whether they have been sufficiently treated or not.

The opposite trunnion to that just referred to is connected to a vapor-pump $l$, which may be substituted by a fan, if so preferred.

In order to hinder the passage and arrest some of the particles which are rubbed off the berries as they are being roasted, I provide a screen $m$, arranged across the outlet, and in order to collect the finer particles passing through said screen a collector $n\,n'$ is inserted between the discharge-trunnion and the pump $l$, as indicated in Figs. 5 and 6. In Figs. 1 and 2 of the drawings the collector is not shown complete, this part being broken away at the point where the collector is located in the practical embodiment of the invention. Said collector is constructed with an outer box or casing $n$, within which is arranged an inner box or casing $n'$, fitted with baffle-plates $o$ and $p$, arranged alternately, one with openings around the sides and the other with an opening in the center, so that the vapor and particles passing through are forced to adopt a circuitous path, the solid particles being deposited within said box, from whence they can afterward be removed and either mixed with the other products or sold separately, as preferred. The outer box or casing is provided with a removable cover $n^2$, which is held tightly closed by screw-bolts $n^3$ or by any other suitable means. A two-way cock or valve $q$ is provided on the other side of the pump between it and what is termed an "impregnator." This two-way cock is constructed so that the vapors discharged by the pump can either be directed into the atmosphere or into said impregnator, the object being to allow the aqueous vapor which is driven off from the coffee when the apparatus first starts to be discharged into the atmosphere, while the volatile caffein, aromatic compounds, and essential oils which are driven off as the roasting proceeds can be directed into said impregnator. This latter consists of a cylindrical vessel $r$, within which are arranged a set of revolving blades or beaters $s$, which keep the chicory or other absorbent material in slow constant agitation, so that every particle will be brought into contact with the caffein-laden vapor from the roasting coffee until it is thoroughly saturated with such caffein, aromatic compounds, and essential oils, when it can be removed and be compressed into tablets or otherwise made up into a marketable form.

The impregnator $r$ is fitted with a valve-chamber $t$, within which is a safety-valve $t'$, the upper part of which chamber $t$ is in communication, by means of a pipe $t^2$, with a coil or set of pipes $u$ within a condenser $v$, the discharge end of said set of pipes being led into a smaller vessel $w$, where the condensed vapor is collected, so as to be usable as required. A siphon $x$ may be used for discharging any surplus fluid from this vessel as required.

Having now particularly described and ascertained the nature of my said invention and in what manner the same is to be performed, I declare that what I claim is—

1. In an apparatus for collecting the waste products of coffee during roasting, the combination with a roasting-cylinder, of an impregnator having a communicating passage with said roasting-cylinder, means interposed between the roasting-cylinder and impregnator for forcing the vapors from the former into the latter, an outlet pipe or passage for said impregnator, a safety-valve controlling the escape of the vapors through said pipe or passage, and a condenser forming a continuation of the outlet pipe or passage serving to collect and condense the vapors escaping from the impregnator, substantially as described.

2. An apparatus for utilizing the waste products of coffee during roasting, comprising in its construction a roaster and an impregnator, combined with a condenser communicating by a pipe or passage with said impregnator, and a safety-valve controlling the escape of the vapors from the impregnator to the condenser, substantially as described.

3. In apparatus for utilizing the waste products of coffee during roasting, a roaster $a$ and an impregnator $r$ together with a pump or fan for forcing the vapors generated in the former into or through the latter in combination with a collector $n$ located between the roaster and the impregnator for intercepting the solid particles given off from the berries during the roasting substantially as and for the purposes herein described and explained.

4. In an apparatus for collecting the waste products of coffee during roasting, the combination with a roaster, of an impregnator having a communicating passage with said roaster, a collector interposed in said passage, and means within the collector for causing the vapors to travel in a circuitous path during their passage therethrough, substantially as described.

LEOPOLD HESSE.

Witnesses:
   EDWARD WATERS, Junr.,
   WALTER SMYTHE BAYSTON.